United States Patent [19]

Grammer

[11] Patent Number: 4,843,683
[45] Date of Patent: Jul. 4, 1989

[54] SHRIMP PEELING MACHINE

[75] Inventor: Arthur Grammer, Deerfield Beach, Fla.

[73] Assignee: Shrimp Wacker, Inc., Pompano Beach, Fla.

[21] Appl. No.: 251,893

[22] Filed: Sep. 30, 1988

[51] Int. Cl.⁴ ............................................. A22C 29/02
[52] U.S. Cl. ............................................. 17/73; 17/48
[58] Field of Search ............................... 17/73, 71, 48

[56] References Cited

U.S. PATENT DOCUMENTS

| | | | |
|---|---|---|---|
| 3,466,699 | 9/1969 | Willis et al. | 17/48 |
| 3,787,928 | 1/1974 | Domecki | 17/71 |
| 4,019,224 | 4/1977 | Amaria et al. | 17/71 |
| 4,210,982 | 7/1980 | Hoffman et al. | 17/48 |
| 4,413,377 | 11/1983 | Betts | 17/73 |
| 4,769,871 | 9/1988 | Betts | 17/73 |

*Primary Examiner*—Willis Little
*Attorney, Agent, or Firm*—Harry W. Barron

[57] ABSTRACT

A shrimp peeling deshelling machine has a frame apparatus for holding a support wheel and tube along the periphery of the support wheel. The support and tube ae rotated by a slow speed motor mechanism and the tube has a slit along the length thereof positioned away from the center of the support. The shrimp peeling machine includes an insertion station that, in turn, has a slit separating member for separating the edges defining the slit. A shrimp is inserted in the opening created by the slit separating member and is caught downstream from the separating member by the slit edges and rotates with the rotating tube and support. A first cutting station cuts the back shell of the shrimp using a conventional rotating circular saw blade. A bottom shell cutting and shrimp ejection station includes a second slit separator and a cutting member for cutting the bottom of the shrimp. One end of the cutting member is positioned within the tube and the cutting member is oriented to exit the tube at the second opening to permit the double cut shrimp to exit the machine.

20 Claims, 2 Drawing Sheets

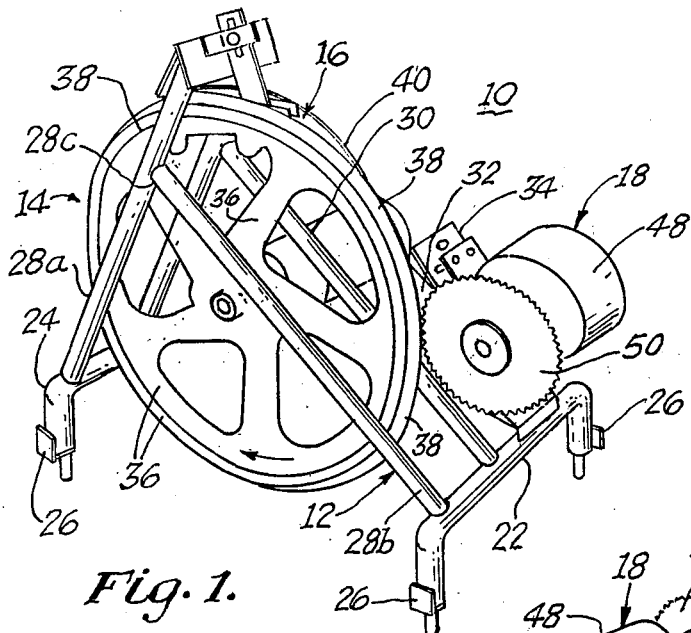
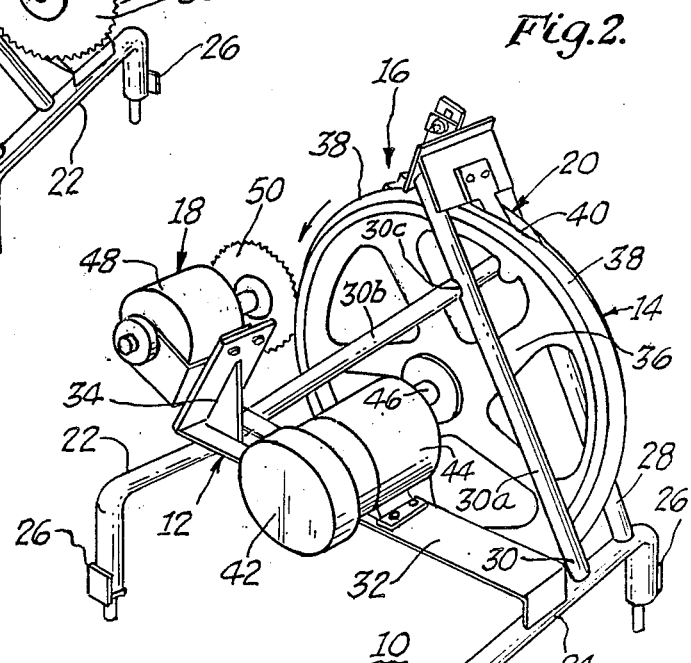
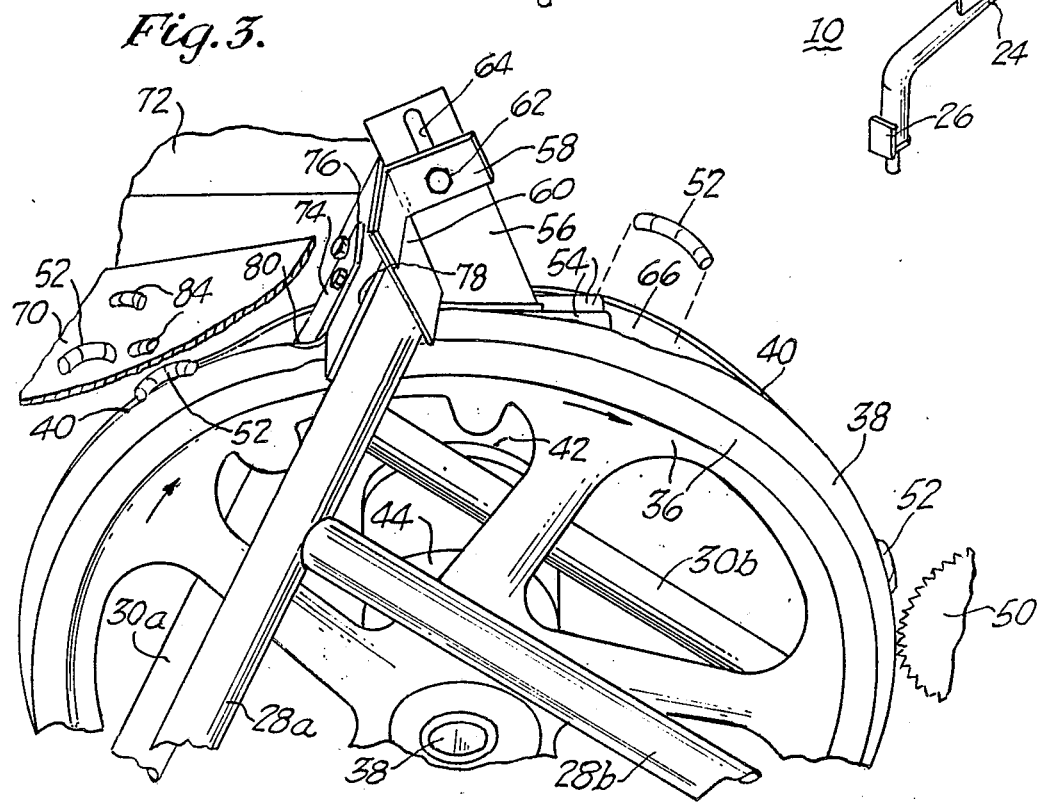

SHRIMP PEELING MACHINE

This invention relates to a shrimp peeling machine, and more particularly, to a shrimp peeling machine which automatically cuts the top and bottom of the shrimp shell.

Automatic shrimp peelings machines have long been known in the prior art. These machines generally are only used to cut the hard top or back shell of the shrimp, leaving the softer bottom or lower portion of the shell to be broken away by manual labor after the cutting process. Further, machines of the prior art are typically very complex in nature, particularly with regard to the machanisms for holding the shrimp in a position to be cut.

Examples of such prior art includes the apparatus described in U.S. Pats. Nos. 3,465,383 in the name of Willis et al, 3,751,766 in the name of Goings-on, 3,737,928 in the name of Domecki, 4,019,224 in the name of Amaria et al, 4,087,887 in the name of Hoffman et al, 4,281,436 in the name of Hoffman et al and 4,413,377 in the name of Betts.

From reviewing the above noted United States Patents, it is seen that all attempts of the prior art to fabricate shrimp peeling machines lead to complex mechanical structure, and hence, expensive machines subject to frequent breakdown. Further, none of the machines of the prior art are able fully to peel the shell from the shrimp without partially destroying the shrimp meat. All of the prior art machines only cut the back shell of the shrimp. Either manual labor is required to separate the shell or the machines use rotating brushes and the like to separate the shell from the meat. Neither of these solutions is ideal. When using manual labor, each shrimp must be handled to remove the shell, since the shell can not fall off itself. This increases the labor cost of using that type of prior art machine. More complex prior art machines use brushes, or other mechanisms, to remove the shell. Use of these machines results in the shell, as well as some of the shrimp meat, being brushed away, thereby reducing the value of the output of that type of prior art machine.

It is well know that if both the back of the shrimp shell as well as the underside of the shrimp shell are cut, the shell can fall off the shrimp by a slight movement of the shrimp. Even where the shell does not completely fall off, it merely hangs on the shrimp and can be easily removed with minimal manual effort. Unfortunately, with the automatic shrimp peeling machines of the prior art, no effective apparatus exists to cut the shrimp shell on both the top and bottom of the shrimp to permit the shell to easily fall off. The reason, of course, is because of the mechanism to hold the shrimp requires that the underside of the shrimp can not be exposed to a saw or blade required for cutting. Thus, to cut the underside of the shrimp would require a major modification of the shrimp handling mechanism of the existing machines to turn the shrimp over and properly position the shrimp for a second cutting. This modification is far too complex to be implemented in a commercially usable machine. What is required is a simplified machine which has the ability to cut both the top and bottom of the shrimp.

In accordance with one aspect of this invention there is provided a shrimp peeling machine which includes rotating means having a flexible hollow shrimp holding member with a longitude slit, the holding member having the edges defining the slit biased to be normally juxtaposed to one another. In addition, the shrimp peeling machine includes insertion station means inserted between the edges defining the slit for separating the edges as the holding member rotates for permitting an inserted shrimp to be held between the edges defining the slit as the holding members rotates past the insertion station means. Further, the shrimp peeling machine includes first cutter means for cutting the back shell of the shrimp at a first cutting station as the shrimp is rotated therepast and second cutter and ejector means, positioned from within to without the holding member, for cutting the bottom of the shrimp and ejecting the shrimp from between the edges defining the slit.

One preferred embodiment of the subject invention hereafter shown, with reference being made to the following Figures, in which:

FIG. 1 shows a perspecitve view from one side of the shrimp peeling machine of the subject invention;

FIG. 2 shows a perspective view from the other side of the shrimp peeling machine;

FIG. 3 is an enlarged perspective view of the shrimp inserting station and shrimp ejecting station of the shrimp peeling machine;

Figure 4:
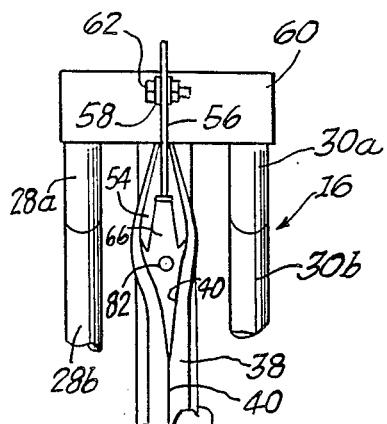
FIG. 4 is a plan view from the top of the shrimp inserting station.
Figure 5:
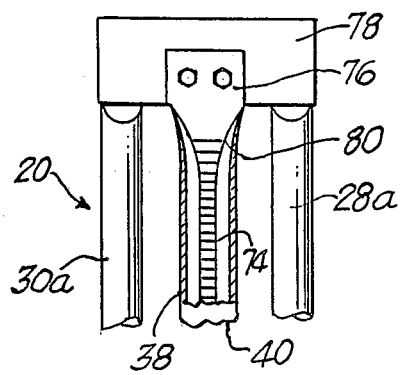
FIG. 5 is a plan view from the top, partially in cutaway, of the bottom shell cutter and ejector station of the shrimp peeling machine.

Referring now to FIGS. 1 and 2, shrimp peeling machine 10 is shown in a perspective view from the front in FIG. 1 and from the back in FIG. 2. It should be appreciated that shrimp peeling machine 10, as shown in FIGS. 1 and 2 is shown without the outer panels, which under normal circumstances would be affixed thereto and cover the components shown. Shrimp peeling machine 10 includes frame apparatus 12, shrimp holding apparatus 14, shrimp insertion station 16, back shell cutter apparatus 18 and bottom shell cutting and ejection station 20. Each of these portion 12–20 (even numbers only) constitute a major component portion of shrimp peeling 10 and will hereafter be described individually in detail.

Frame apparatus 12, includes a pair of leg stands 22 and 24 each of which includes two vertical legs and a horizontal connector member. Container panel brackets 26 are affixed to each of the four legs of leg stands 22 and 24 to hold the outer panels (not shown). Each of the legs of leg stands 22 and 24 are independently adjustable to properly position shrimp peeling machine 10 on a non-uniformed surface, if necessary. In addition, frame apparatus 12 includes a front bracket 28 and back bracket 30, each of which are affixed by, for example, welding to legs stands 22 and 24. Each of front and back brackets 28 and 30 include first and second straight tubular members 28a, 28b and 30a, 30b extending from leg stands 24 and 22 respectively. The legs 28a and 28b and the legs 30a and 30b are coupled together at apexes 28c and 30c respectively and legs 28a and 30a extend past apexes 28c and 30c to be near the top of shrimp holding apparatus 14. The two frames 28 and 30 are spaced apart from one another by an amount sufficient to permit the circular shrimp holding apparatus 14 to freely rotate therebetween in a manner to be described hereafter.

In addition, frame apparatus 12 includes a motor mount panel 32 which has a back shell cutting motor bracket 34 affixed thereto. Panel 32 is affixed between legs 22 and 24 and is positioned outside of back bracket 30. With panel 32, frame apparatus has the shape and strength of an A frame structure.

Figure 6:
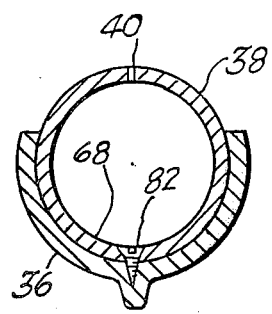
FIG. 6 is a cross sectional view of the shrimp holding apparatus of the shrimp peeling machine.
Figure 7:
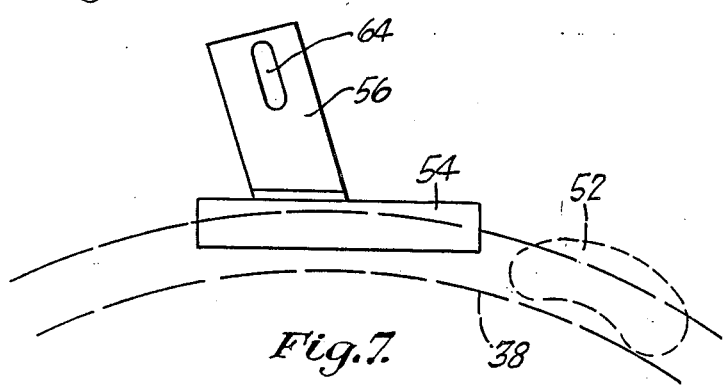
FIG. 7 is schematic representation of the insertion station from the side.
Figure 8:
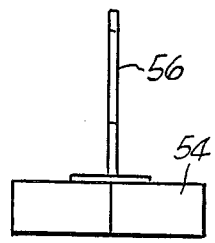
FIG. 8 is a schematic representation of the shrimp insertion station from the front.

Shrimp holding apparatus 14 includes a circular support wheel 36 having a tube 38 around the circumference thereof. Tube 38 has a slit 40 extending along the entire length thereof and positioned to face outward from the radial center of support wheel 36. FIG. 6 shows a cross-sectional view, taken across lines 6—6 of FIG. 3, of tube 38 mounted on support wheel 36 and the position of slit 40. Tube 38 may be secured to support wheel 36 by screw 82 positioned flush with the bottom 68 of tube 38. Tube 38 is fabricated of an elastic material, such as hard rubber or polyurethane, so that the edges defining slit 40 are biased towards one another, when separated. Support 36 may further extend above the horizontal diameter of tube 38, as seen in FIG. 6, to provide the bias for tube 38 to cause the edges defining slit 40 to be juxtaposed to one another, when separated.

A motor 42 is mounted on motor mount panel 32 and includes a speed reducer 44 for providing a low RPM circular motion to shaft 46. For example, six revolutions per minute may be used. Shaft 46 is coupled to the center of support wheel 36 and causes support wheel 36 and tube 38 to rotate in the direction shown by the arrows.

Back shell cutting apparatus 18 includes a motor 48, mounted on bracket 34, having a rotating shaft to which circular saw blade 50 is affixed. As best seen in FIG. 2, bracket 34 is positioned at an angle with respect to motor mount panel 32. Motor 48 may be adjusted upward or downward on bracket 34 so as to be moved toward or away from slit 40, thereby moving blade 50 closer to or away from slit 40. As will be explained hereafter, shrimp 52, to be cut, are held in slit 40 and extend outward from slit 40 by an amount depending on the size of the shrimp 52. Thus, for larger shrimp 52, blade 50 is positioned further away from slit 40 by mounting motor 48 lower on bracket 34 and for smaller shrimp blade 50 is positioned closer to slit 40 by mouting motor 48 higher on bracket 34.

The back shell cutting apparatus 18 operates to saw the hard back sheel of the shrimp 52, as the shrimp 52 is rotated past blade 50. This type of back shell cutting apparatus is particularly useful for rock shrimp, which have very hard shells and are not easily cut by other mechanisms.

Referring now to FIGS. 3, 4, 7, 8 and 9, the detailed structure of insertion station 16 will be described. Insertion station 16 is affixed from the top of tubular members 28a and 30a and includes a slit separating member 54 having a bracket 56 extending at an angle upward therefrom. Bracket 56 is slideably held by slide bracket 60 to permit slit separating member 54 to be properly positioned between the two edges forming slit 40. Bracket 60 is, in turn, affixed between front tubular bracket 28a and back tubular bracket 30a as best seen in FIG. 3. Bracket 56 may be affixed to slide bracket 58 by using a bolt 62 inserted through a hole 64 of bracket 56. When bracket 56 is properly positioned between the two edges forming slit 40, it separates the two edges from one another to form an opening 66 into which a shrimp 52 may be inserted for being thereafter held between the edges forming slit 40.

Figure 9:
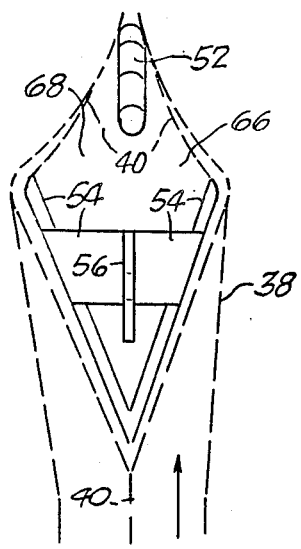
FIG. 9 is a schematic representation of the shrimp insertion station from the top.
Figure 10:
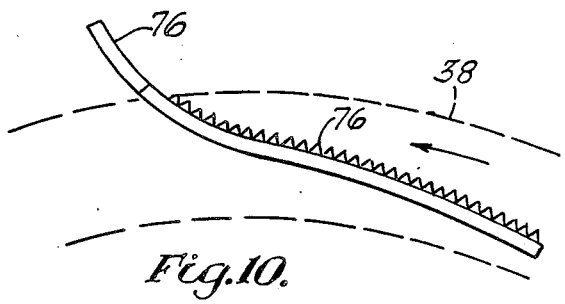
FIG. 10 is a schematic representation of the bottom cutter and ejector station from the side.
Figure 11:
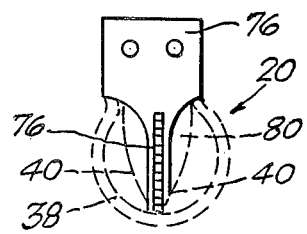
FIG. 11 is a schematic representation of the bottom cutter and ejector station from the top.

Slit separating member 54 may be generally a V shaped member having the point, or apex, of the V pointed opposite to the direction of rotation of tube 38. Further, the apex of the V shaped slit separating member 54 is positioned to be in alignment with slit 40 as it rotates toward member 54. Thus, as tube 38 rotates, the edges defining slit 40 are separated by the V shape slit separating member 54 to create the opening 66 downstream from member 54, as best seen in FIGS. 3 and 9. It should be noted that separating member 54 need not have a V shape, nor a pointed apex. The functional requirement served by separating member is to merely separate the edges defining slit 40 and this may be accomplished by an interfering member placed in slit 40, although the V shape operates most efficiently.

When it is desired to insert shrimp 52 into machine 10 for deshelling, shrimp 52 is placed in opening 66 on the bottom 68 of tube 38. The forward movement of tube 38, due to the rotation imparted thereto by motor 42 and speed reducer 44, moves the inserted shrimp 52 downstream from slit separating member 54. As the shrimp 52 moves further downstream away from slit separating member 54, the edges of slit 40 comes closer and closer together, until they approach their normal position of juxtaposed to one another. When a shrimp 52 is inserted, it is held between the edges of slit 40 as the edges close downstream from slit separating member 54.

Referring Now to FIGS. 3, 5, 10 and 11, the bottom shell cutting and ejection station 20 will be described. As previously explained, the purpose of ejection station 20 is to cut the bottom portion of the shrimp 52 shell and to eject the shrimp 52 on to a tray 70, seen in FIG. 3. Preferably tray 70 is built into the outer panels 72, a portion of which is shown in FIG. 3, and is positioned at a downward angle to permit the deshelled shrimp to fall by gravitational forces downward on tray 70 away from station 20. Cutting and ejection station 20 includes a cutting member 74 extending at an angle downward from a bracket 76. Bracket 76, in turn, is held by a bracket 78, which is affixed to tubular members 28a and 30a. Bracket 76 is significantly wider than cutting member 74 and is positioned to be oriented to intersect slit 40, so as to separate slit 40, thereby creating an opening 80 at bottom shell cutting and ejection station 20.

Cutting member 74 may be a knife or saw tooth instrument which can cut the softer bottom shell of shrimp 52 as shrimp 52 is rotated over cutting member 74. Cutting member 74 is positioned at a slight angle from bracket 76 to force the shrimp upward and outward from tube 38 as it is being cut and as opening 80 begins due to the separation of slit 40. The velocity of the shrimp as it is ejected through opening 80 against bracket 76 forces the shrimp to bounce off bracket 76 onto tray 70. After the shrimp are cut on the top by blade 50 and on the bottom by cutting member 74, the force of bouncing off plate 76 onto tray 70 normally causes the shell 84 to fall away from the shrimp 52. Thus, the person operating the machine 10 merely pulls the deshelled shrimp meat from tray 70 and allows the shells 84 to fall in a trash container at the end of tray 70.

Occasionally, the operator will have to remove the shells 84 from the shrimp meat 52, where they have stuck together. However, the shells are very easily removed due to the two cuts and can be thrown back into tray 70 for later disposal in the trash container.

What is claimed is:

1. A shrimp peeling machine comprising:
   rotating means having a flexible hollow shrimp holding member with a longitudinal slit, said holding member having the edges defining said slit biased to be normally juxtaposed to one another;
   insertion station means, inserted between said edges defining said slit, for separating said edges as said holding member rotates, for permitting an inserted shrimp to be held between said edges defining said slit as said holding member rotates past said insertion station means;
   first cutter means for cutting the back shell of said shrimp at a first cutting station as said shrimp is rotated therepast; and
   second cutter and ejector means positioned from within to without said holding member for cutting the bottom of said shrimp and ejecting said shrimp from between said edges defining said slit.

2. The invention according to claim 1 wherein said insertion station means a separating member having an apex and legs extending from said apex in an expanding direction, said apex being oriented in a direction opposite to the direction of rotation.

3. The invention according to claim 2 wherein said insertion station means includes means remote from said shrimp holding member for fixedly supporting said separating member in the hollow portion of said shrimp holding means, said legs of said separating member extending out of said hollow portion past said edges defining said slit.

4. The invention according to claim 3 wherein said shrimp holding member is a hollow tube.

5. The invention according to claim 4 wherein said rotating means includes a support for holding said shrimp holding means and motor means for rotating said support.

6. The invention according to claim 5 wherein said support is circular.

7. The invention according to claim 6 wherein said first cutter means includes a rotating circular saw blade aligned with said slit.

8. The invention according to claim 7 wherein said second cutter and ejector means includes slit separating means for separating said slit and stationary cutting means angularly positioned from within said hollow portion towards said slit separating means.

9. The invention according to claim 8 wherein said slit separating means is positioned to guide said shrimp away from said shrimp holding member as said shrimp holding member rotates therepast.

10. The invention according to claim 9 wherein said second cutter and ejector means includes means remote from said shrimp holding member for fixedly supporting said second cutter and ejector means for within said hollow portion of said shrimp holding means.

11. The invention according to claim 1 wherein said second cutter and ejector means includes slit separating means for separating said slit and stationary cutting means angularly positioned from within said hollow portion towards said slit separating means.

12. The invention according to claim 10 wherein said slit separating means is positioned to guide said shrimp away from said shrimp holding member as said shrimp holding member rotates therepast.

13. The invention according to claim 1 wherein said second cutter and ejector means includes means remote from said shrimp holding member for fixedly supporting said second cutter and ejector means from within the hollow portion of said shrimp holding means.

14. The invention according to claim 13 wherein insertion station means includes means remote from said shrimp holding member for fixedly supporting said separating member in said hollow portion of said shrimp holding means.

15. The invention according to claim 1 wherein said insertion station means includes means remote from said shrimp holding member for fixedly supporting said separating member in the hollow portion of said shrimp holding means.

16. A peeling machine for cutting the top and bottom of a shrimp for the purpose of deshelling, said machine comprising
   a rotating support circular member for supporting a hollow tube having a longitudinal slit through the wall thereof facing away from the axis of rotation, said slit defining a pair of edges, said edges being biased towards one another;
   stationary separator means positioned between said slit edges for separating said slit edges to permit a shrimp to be inserted between and held by said slit edges as said tube is rotated away from said separator means; and
   means for cutting said shrimp as said held shrimp is rotated.

17. The invention according to claim 16 wherein said machine further includes stationary shrimp ejecting means angularly positioned from within said tube to out of said tube, said ejecting means further including means to separate and slit to permit said shrimp to be released from said slit edges and guided away from said tube by said ejecting means.

18. The invention according to claim 17 wherein ejecting means further includes second cutting means for cutting the bottom of said shrimp as it is ejected from said tube.

19. The invention according to claim 18 wherein said first mentioned cutting means cuts the top shell of said shrimp.

20. The invention according to claim 19 wherein said first cutting means includes a rotating circular saw blade.

* * * * *